C. W. GIFT.
CULTIVATOR.
APPLICATION FILED SEPT. 14, 1911.

1,024,986.

Patented Apr. 30, 1912.

WITNESSES
Samuel E. Wade
C. E. Trainor

INVENTOR
CHARLES W. GIFT.
BY Munn & Co.
ATTORNEYS

UNITED STATES PATENT OFFICE.

CHARLES WILLIAM GIFT, OF WAYNESBORO, PENNSYLVANIA.

CULTIVATOR.

1,024,986.  Specification of Letters Patent.  Patented Apr. 30, 1912.

Application filed September 14, 1911. Serial No. 649,258.

*To all whom it may concern:*

Be it known that I, CHARLES W. GIFT, a citizen of the United States, and a resident of Waynesboro, in the county of Franklin and State of Pennsylvania, have made certain new and useful Improvements in Cultivators, of which the following is a specification.

My invention is an improvement in cultivators, and has for its object, the provision of a simple, inexpensive hand operated device of the character specified, wherein means is provided for swinging the supporting wheel on a vertical axis to guide or steer the plow laterally.

Figure 1:
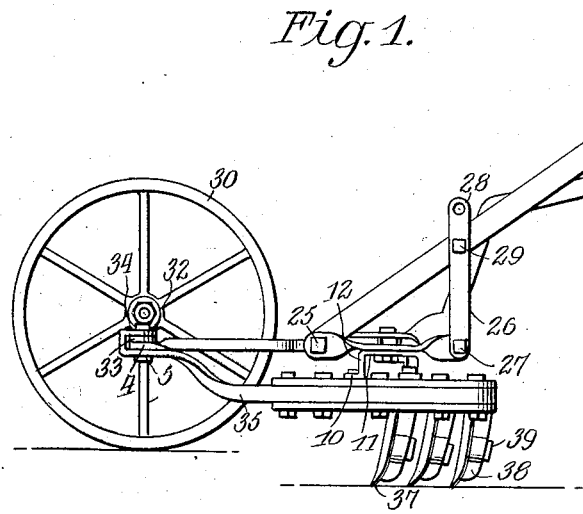
Figure 5:
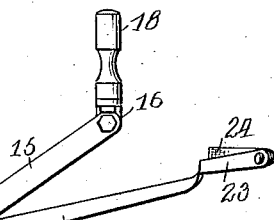
Figure 2:
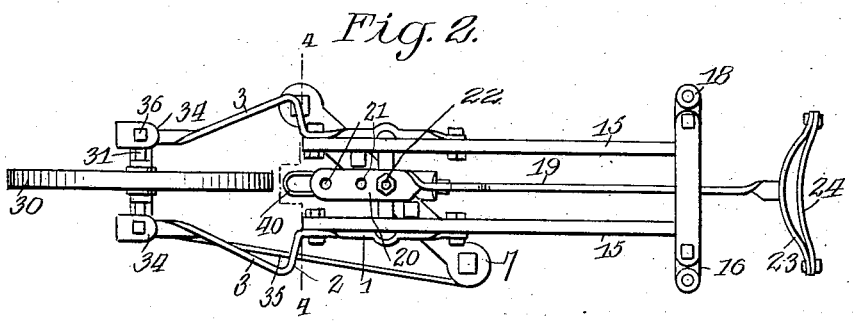
Figure 3:
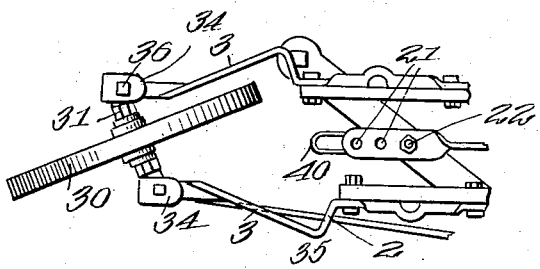
Figure 4:
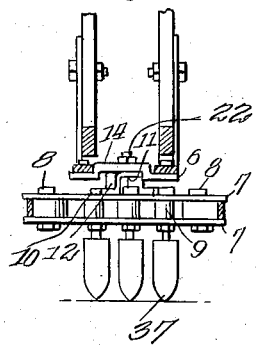

In the drawings—Figure 1 is a side view of the improvement, Fig. 2 is a top plan view, Fig. 3 is a partial bottom plan view, Fig. 4 is a section on the line 4—4 of Fig. 2, looking in the direction of the arrows, and Fig. 5 is a perspective view of the bracket.

The present embodiment of the invention comprises a frame, composed of spaced bars which are parallel at their rear ends for a portion of their length, as indicated at 1. The front ends of the bars are then bent laterally outward at 2, forward and inward at 3, and the front end of each is given a quarter turn to form a lug 4, which is provided with a transverse opening for receiving a bolt to be described. Each bar is also given a quarter turn at approximately the center of the portion 1, and a cross bar 6 connects the bars at this point. A pair of parallel superposed plates 7 are arranged below the frame, the said plates being connected by bolts 8, and spaced in a manner to be presently described. The plates are connected to the frame by means of a bracket composed of laterally offset portions 10 and 11, connected by an angular portion 12, the portion 10 being secured to the plates, and the portion 11 to the cross bar 6. The said bar is provided with an upwardly extending arch 13 at its center.

Handle bars 15 are connected at one end to the front portions of the portions 1 of the straps as indicated at 25, and the other ends of the handle bars are connected to angle plates 16, secured to the ends of a plate 17, arranged transverse to the handle bars and provided at each end with a grip or handle 18.

A push bar 19 is provided for pushing the plow. The said bar is arranged with its wide dimensions vertical, and at its rear end is provided with a transverse yoke 23. The ends of the yoke are connected by a strap 24 of leather or the like, for engagement by the chest of the operator. The opposite end of the bar 19 is offset downwardly and the extremity 20 thereof is given a quarter turn, and is provided with a longitudinal series of openings 21, for engagement by a bolt 22, passing through the cross bar 6 before mentioned.

The handle bars 15 are supported near their front ends by standards 26, each of which is bolted at its lower end to the rear end of the adjacent bar 1, by means of a bolt 27, and the upper end of each standard is provided with a plurality of openings 28, for engagement by a bolt 29, passing through the adjacent handle bar.

A wheel 30 is journaled on a stub shaft 31, held in openings in the vertical portions 32 of angle plates, whose longitudinal portions 33 are received between the turned over end 34 of links 35, and held in place by bolts 36. The opposite ends of the links 35 are bent around the sleeves 9, which encircle the end bolts 8, connecting the plates 7. The forward end of each of the bars of the frame is also received between the portions 34 of the links and the body thereof, and the bolts 36, pass through the said ends, and the portions 33 of the angle plates 32 and 33.

Cultivating plows or teeth 37 are connected with the plates 7. Each plow is detachably connected to a shank 38, by means of a bolt 39, and each shank is longitudinally slotted at 40, for receiving a bolt 8, connecting the plates 7. By loosening the bolts the shanks may be moved longitudinally to adjust the plow. The shanks of the plows assist in spacing the plates 7 intermediate the ends thereof. Preferably the slot 40 of the central plow shank is of greater length than the shanks of the lateral plows to permit the said plow to be arranged either in front or behind the lateral plows.

The cross bar 6 is pivoted at its ends to the portions 1 of the frame bars, and by moving the handles 18 longitudinally with respect to each other, the stub shaft 31, that is the axis of wheel 30 may be inclined with respect to the direction of movement of the plow, to steer the plow laterally. This may be done without stopping the plow, since it is pushed by the operator, resting his chest against the strap 24. The inclination of the handle bars 15 may be changed by engaging the bolt 29 with different openings. The push bar may also be adjusted longitudinally, by engaging the bolt 22 with different openings of the series 21.

The push bar is detachable, being pivoted to the bolt 22, and can be removed if for any reason desired. The connection between the portion 11 of the bracket 10, 11, 12 and the cross bar is a lost motion or slidable connection, the portion 11 of the bracket being slotted to permit the cross bar to move with respect to the bracket.

I claim:

1. In a plow, a frame comprising spaced bars, a cross bar pivoted at each end to the bars near their rear ends, a plow support comprising vertically spaced plates, plow shanks received between the plates, each shank having a longitudinal slot, bolts connecting the plates, and passing through the slots of the shanks, plow points on the shanks, said plates being inclined with respect to the line of draft of the frame, a link connected with each end of the plates and extending forwardly, a wheel at the front end of the frame bars, a shaft on which the wheel is journaled, angle plates each having one side connected with an end of the shaft, a pivotal connection between the other side of the plates, the front end of the frame bars and the front ends of the links, a push bar adjustably connected to the cross bar of the frame, a handle bar connected with each frame bar in front of the cross bar, a plate connecting the handle bars, and a handle at each end of the plate.

2. A plow comprising a frame composed of spaced bars, a cross bar pivoted at each end to the frame bars, a wheel at the front ends of the said bars, a shaft on which the wheel is journaled, a pivotal connection between each end of the shaft and the adjacent frame bar, a plow supporting frame below the main frame and supported thereby, a link connecting each end of the said plow supporting frame to the front end of the adjacent frame bar, a push bar connected to the cross bar, a handle bar connected with each frame bar, a plate pivotally connecting the handle bars, and a handle at each end of the plate.

3. A plow comprising a frame composed of spaced bars, a cross bar pivoted at each end to the frame bars, a wheel at the front ends of the said bars, a shaft on which the wheel is journaled, a pivotal connection between each end of the shaft and the adjacent frame bar, a plow supporting frame below the main frame and supported thereby, a link connecting each end of the said plow supporting frame to the front end of the adjacent frame bar, a push bar connected to the cross bar, and means connected with each frame bar for moving said bar longitudinally.

4. In a plow, a main frame composed of spaced bars, a cross bar pivoted at each end to a frame bar, a shaft pivoted at each end to the front end of a frame bar, a wheel on the shaft, a plow supporting frame supported below the main frame, a link connecting each end of the said frame to the adjacent frame bar, a push bar connected to the cross bar, a handle bar connected to each frame bar, a plate pivotally connecting said bars, and a handle at each end of the plate.

5. In a plow, a main frame composed of spaced bars, a cross bar pivoted at each end to a frame bar, a shaft pivoted at each end to the front end of a frame bar, a wheel on the shaft, a plow supporting frame supported below the main frame, a link connecting each end of the said frame to the adjacent frame bar, a push bar connected to the cross bar, a handle bar connected to each frame bar, and a handle at the rear end of each handle bar.

6. In a plow, a main frame composed of spaced bars, a cross bar pivoted at each end to a frame bar, a shaft pivoted at each end to the front end of a frame bar, a wheel on the shaft, a plow supporting frame, supported below the main frame, a link connecting each end of the said frame to the adjacent frame bar, a push bar connected to the cross bar, and a handle connected to each frame bar and extending alongside the push bar.

7. In a plow, a main frame composed of spaced bars, a cross bar pivoted at each end to a frame bar, a shaft pivoted at each end to the front end of a frame bar, a wheel on the shaft, a plow supporting frame supported below the main frame, a push bar connected to the cross bar, and a handle bar connected to each frame bar.

8. In a plow, a main frame composed of spaced bars, a cross bar pivoted at each end to a frame bar, a push bar connected with the cross bar, a handle bar connected with each frame bar and extending alongside the push bar, a plow supporting frame depending from the main frame, a shaft at the front ends of the frame bars and pivoted at each end to a bar, and a wheel on the shaft.

9. A plow comprising a shaft, a wheel on the shaft, a frame bar having its front end pivoted to each end of the shaft, a swinging connection between the bars, a push bar connected with the said connection, a handle connected with each frame bar for moving said bar longitudinally and means on the frame for supporting the plows.

CHARLES WILLIAM GIFT.

Witnesses:
JOHN A. CUMMINS,
DAVID HEILBRON.

Copies of this patent may be obtained for five cents each, by addressing the "Commissioner of Patents, Washington, D. C."